US006568449B2

(12) United States Patent
Owen et al.

(10) Patent No.: US 6,568,449 B2
(45) **Date of Patent: *May 27, 2003**

(54) APPARATUS FOR MOUNTING A CUTTING STRIP

(75) Inventors: Edwin Wyn Owen, Coventry (GB); Ian Jamie, Warwickshire (GB)

(73) Assignee: Carton Edge Systems Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/969,416

(22) Filed: Oct. 1, 2001

(65) Prior Publication Data

US 2002/0007918 A1 Jan. 24, 2002

Related U.S. Application Data

(63) Continuation of application No. 09/269,296, filed as application No. PCT/GB97/02669 on Sep. 29, 1997, now Pat. No. 6,325,128.

(30) Foreign Application Priority Data

Sep. 28, 1996 (GB) ............................................ 9620296

(51) Int. Cl.[7] .......................... B32B 31/00; B26D 3/00; B26D 5/20; B31B 1/90

(52) U.S. Cl. ....................... 156/518; 156/530; 156/566; 156/520; 156/521; 156/261; 156/355; 156/362; 156/515; 156/251; 156/358; 493/86; 493/378

(58) Field of Search ................................ 156/261, 269, 156/518, 519, 530, 521, 566, 520, 355, 515, 362, 251, 358, 528; 493/86, 78, 347, 331, 334, 335, 382, 378, 73, 74, 75, 76, 77, 56, 84; 225/43, 48, 49, 91

(56) References Cited

U.S. PATENT DOCUMENTS

| | | | |
|---|---|---|---|
| 1,843,429 | A | 2/1932 | Marcalus |
| 3,845,894 | A | 11/1974 | Merlin |
| 3,986,440 | A | 10/1976 | Macdonald et al. |
| 4,450,996 | A | 5/1984 | Kamp |
| 4,506,816 | A | 3/1985 | Roccaforte |

(List continued on next page.)

FOREIGN PATENT DOCUMENTS

| | | | |
|---|---|---|---|
| DE | 89 04 789 U | | 8/1989 |
| EP | 0 126 833 | A1 | 12/1984 |
| EP | 0 603 398 | | 6/1994 |
| EP | 0 606 529 | A1 | 7/1994 |
| EP | 0 668 150 | A1 | 8/1995 |

(List continued on next page.)

*Primary Examiner*—Linda Gray
(74) *Attorney, Agent, or Firm*—Kilpatrick Stockton LLP

(57) ABSTRACT

This invention provides an apparatus for attaching a cutting strip to a carton blank. The apparatus includes a first member for conveying carton blanks past a second member, and the second member is arranged to cut a cuffing strip from a supply of cuffing strip material and deposit the cutting strip upon a carton blank. The first member may be a conveyor belt fitted with a suction member, and the second member may be upper and lower dies that are movable relative to one another and a member that can feed a supply of cutting strip material between the dies. Initial downward movement of the upper die cuts a cutting strip from the supply of cutting strip material and the cutting strip is retained on the upper die. Further downward movement of the upper die brings the cutting strip into contact with a carton blank. The apparatus may also include an alignment member to ensure that the carton blanks are properly positioned relative to the second member when the cutting strips are attached.

21 Claims, 3 Drawing Sheets

U.S. PATENT DOCUMENTS

| | | | |
|---|---|---|---|
| 4,640,731 | A | 2/1987 | Lerner et al. |
| 4,838,982 | A | 6/1989 | Klaeser et al. |
| 5,011,561 | A | 4/1991 | Carolus et al. |
| 5,135,784 | A | 8/1992 | Okumura et al. |
| 5,224,405 | A | 7/1993 | Pohjola |
| 5,730,816 | A | 3/1998 | Murhpy |
| 5,730,831 | A | 3/1998 | Jensen, Jr. et al. |
| 5,839,634 | A | 11/1998 | Pollard et al. |
| 5,866,221 | A | 2/1999 | Owen et al. |
| 5,897,392 | A | 4/1999 | Takahashi et al. |
| 5,897,736 | A | 4/1999 | Kawai et al. ............... 156/261 |
| 5,897,739 | A | 4/1999 | Forster et al. |
| 6,325,128 | B1 | 12/2001 | Owen et al. |

FOREIGN PATENT DOCUMENTS

| | | |
|---|---|---|
| FR | 2 576 588 | 1/1986 |
| GB | 998219 | 7/1965 |
| GB | 1 528 040 | 10/1978 |
| GB | 2 159 761 | 11/1985 |
| GB | 2 272 682 A | 5/1994 |
| GB | 2 301 310 | 4/1996 |
| JP | 162743 | 6/1993 |
| NL | 6 900 686 A | 7/1970 |
| WO | WO 96/35574 | 11/1996 |
| WO | WO 96/19343 | 12/1996 |
| WO | WO 98/13197 | 4/1998 |
| WO | WO 01/64567 | 9/2001 |

APPARATUS FOR MOUNTING A CUTTING STRIP

This application is a continuation of U.S. Ser. No. 09/269,296 filed May 10, 1999 entitled "Apparatus for Mounting a Cutting Strip" by Edwin Owen and Ian Jamie, now U.S. Pat. No. 6,325,128 which is a 371 of PCT Application No. PCT/GB97/02669 filed Sep. 29, 1997, claiming benefit of the filing date of Great Britain Application No. 9620296.5 filed Sep. 28, 1996, the entire contents of each of which are hereby incorporated by reference.

BACKGROUND OF THE INVENTION

1. Field of the Invention

The invention relates to apparatus for mounting a cutting strip.

2. Description of the Related Art

It is known to mount a metal cutting strip on a carton for cling film so that cling film withdrawn from the carton can be cut on the metal cutting strip. The metal strip may be applied by a machine in which metal sheet from a roll is advanced by passing between driven rollers. The sheet enters a guide which directs the sheet between a fixed lower die and a movable upper die. When the upper die has cut a strip from the sheet, the strip is held onto the die by suction and is carried down onto a carton blank. At the same time as cutting the strip, the strip is perforated by downward pegs which leave downwardly extending teeth around each perforation. The pressure of the upper die forces the teeth into the carton to mechanically fix the metal strip to the carton. The carton blank is brought up to the die and stopped for the cutting strip to be mounted. The conveyor belt for the die is then reversed to move the blank away from the die and bring another blank into position.

SUMMARY OF THE INVENTION

According to one aspect of the invention there is provided apparatus 10 for mounting a cutting strip on a carton blank comprising first means for carrying a carton blank past a second means 16, the second means 16 being arranged to cut the cutting strip and deposit the cutting strip on the carton blank.

As the blank is carried past the second means, rather than towards and then away from it, as in the known apparatus, the need to slow the blank to a halt and then reverse its direction of movement is removed and the speed of processing is increased.

Preferably the first means is arranged to move continuously

According to another aspect of the invention, there is provided apparatus for mounting a cutting strip on a carton blank comprising first means for continuously carrying a first blank past second means, the second means being arranged to cut the cutting strip and deposit the cutting strip on the carton blank.

As the blank is not stopped to have the cutting strip mounted upon it, the speed of processing is greatly increased.

The second means may be operated in any suitable manner and preferably is operated mechanically or hydraulically. Hydraulic or mechanical operation provide good speed and control over the process.

Sensing means may be provided to sense a blank carried by the first means and trigger the second means. The second means may be triggered after a calculated delay from sensing of a blank by the sensing means.

The first means may take any suitable form but preferably is a conveyor belt. The first means may include negative pressure means to hold the blank thereon.

Alignment means is preferably provided to align the blank with the second means. The alignment means may comprise a channel of pre-determined width. This arrangement is convenient where the cutting strip is to be placed onto the blank adjacent a fold line in the blank, but clearly cannot be used where the cutting strip is to be mounted overlapping a free edge of the blank. In that case the alignment means may comprise an abutment member and means to urge the blank against the abutment member. The abutment member will thus lie opposite the second means so that the carton blank is in the correct position as it moves past the second means. The urging means may take any suitable form. In one embodiment the urging means comprises a roller which may be at an angle to the direction of movement of the carton blank by the first means. Alternatively, the urging means may comprise arrangement of the direction of movement by the first means at an angle to the abutment member such that the blank is automatically moved into contact with the abutment member. In order for the cutting strip to be correctly orientated on the blank, which is normally rectangular, the second means will need to be square with the abutment member and the angle of the abutment member and/or the second means may be adjustable.

An embodiment of the invention will now be described by way of example and with reference to the accompanying drawings in which:

DETAILED DESCRIPTION OF SPECIFIC EMBODIMENTS OF THE INVENTION

Figure 1:
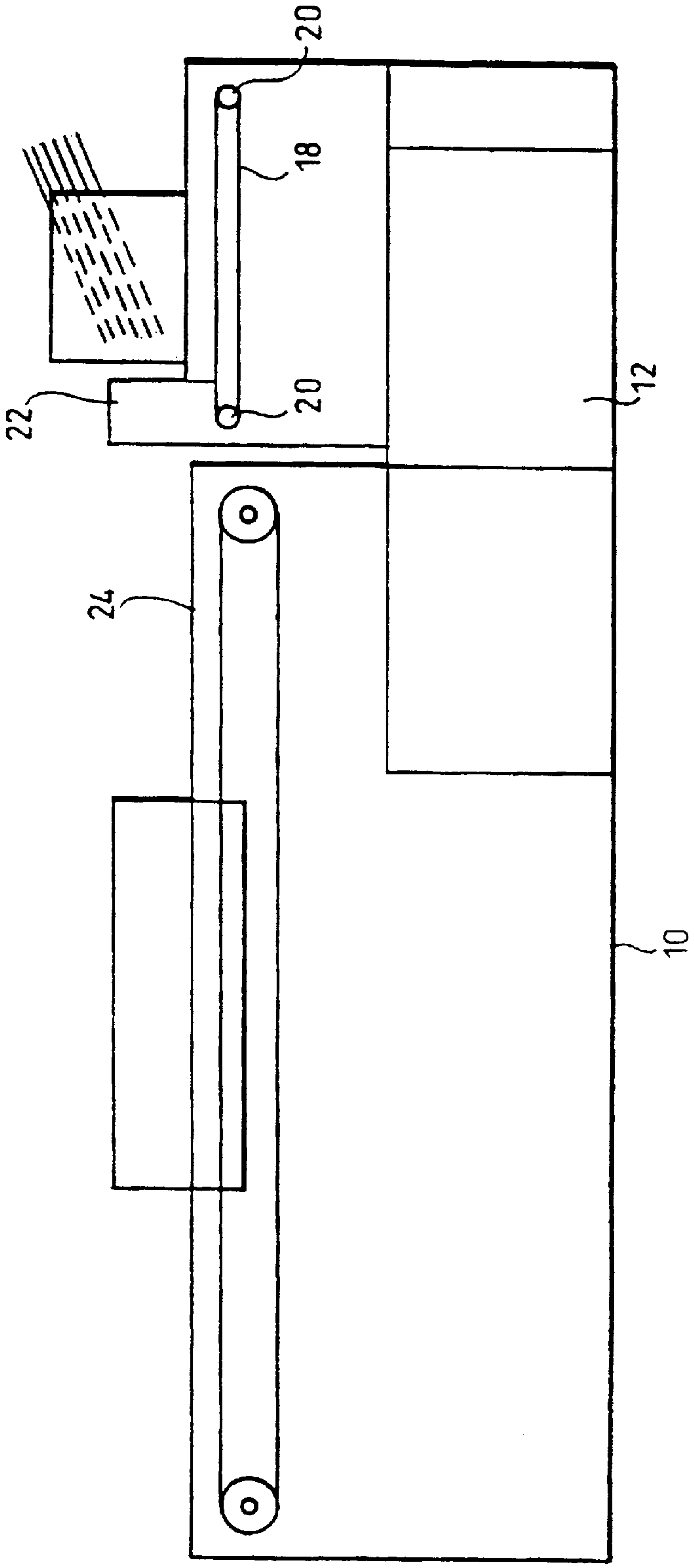
FIG. 1 is a side elevation of the apparatus of the embodiment.
Figure 2:
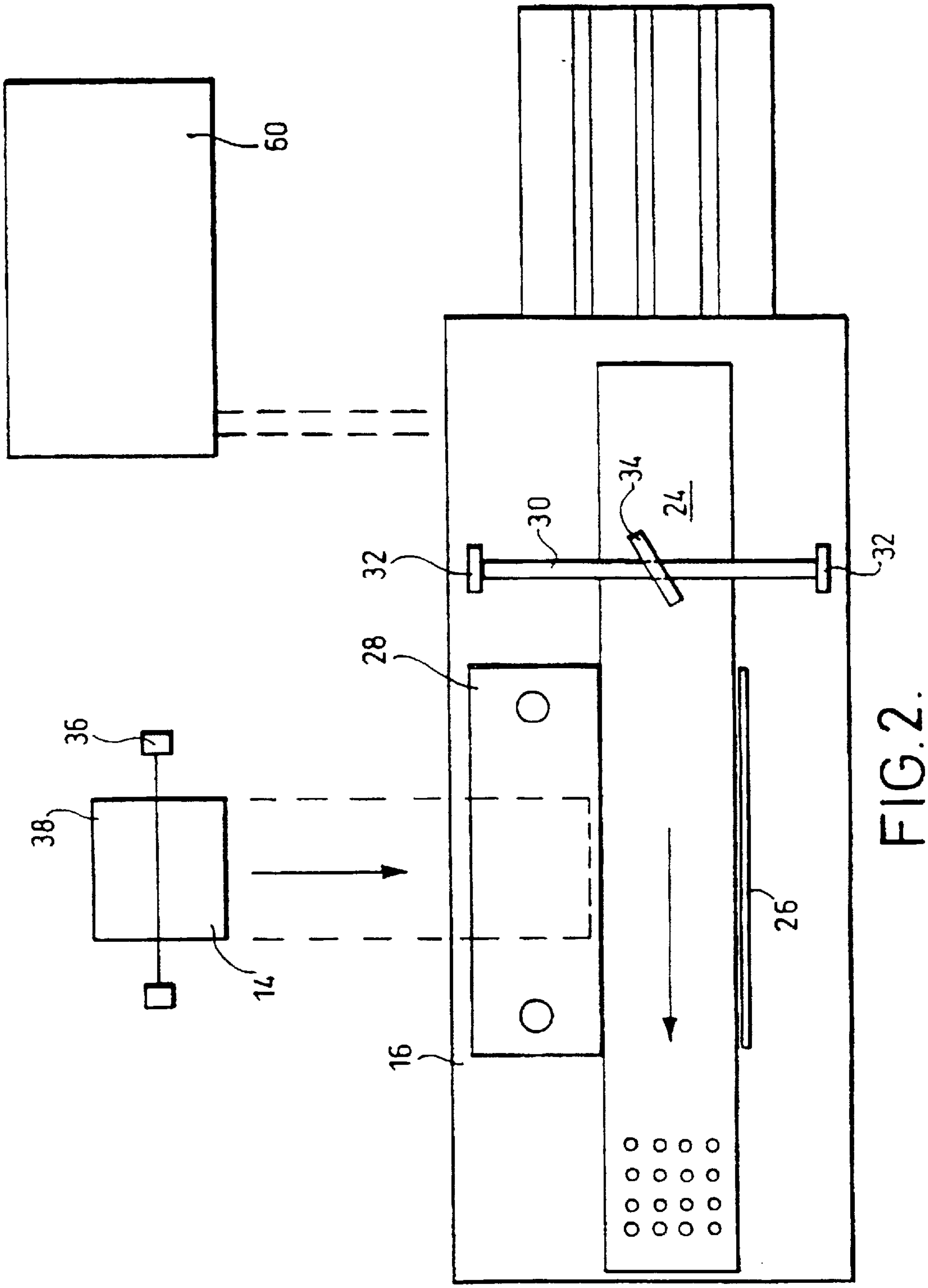
FIG. 2 is a plan view of the apparatus of FIG. 1.
Figure 3:
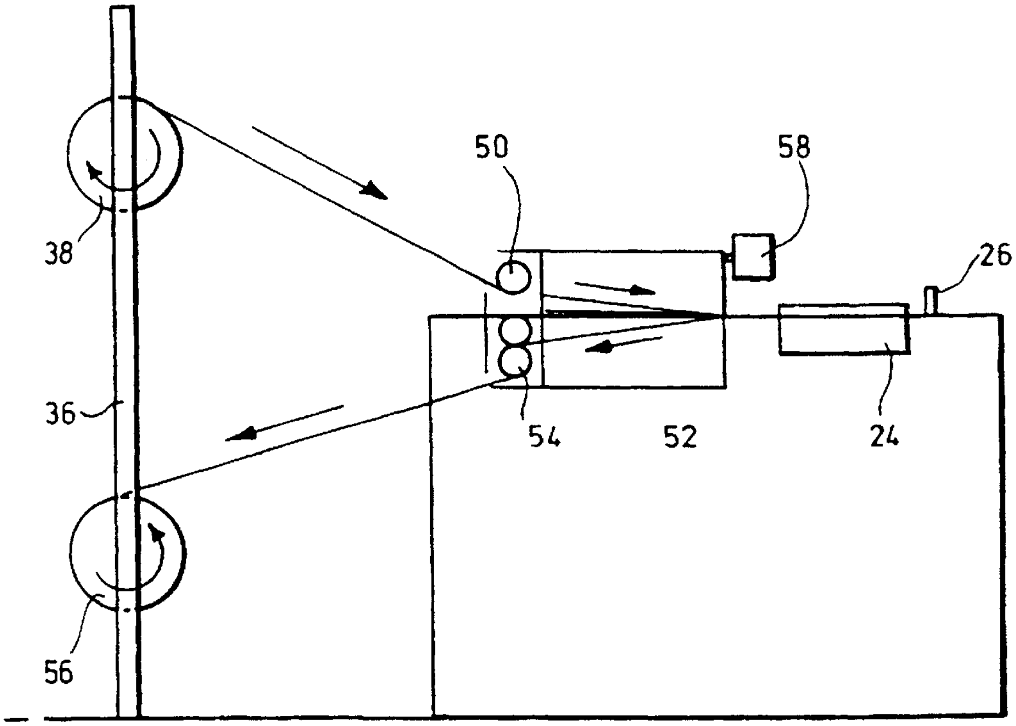
FIG. 3 is an end elevation of the apparatus of FIG. 1.

The apparatus 10 of the embodiment of the invention comprises a carton blank feeder unit 12 and a cutting strip material feed unit 14 both leading to a cutting strip application station 16.

The carton blank feeder unit 12 comprises a conveyor belt 18 on two rollers 20. An upright feed gate 22 is provided over the belt 18 in front of the front roller 20. Side walls are provided to either side of the feed gate 22 and the feed gate is adjustable upwards and downwards with respect to the side walls. Carton blanks are placed in a stack on the feeder unit behind the feed gate 22 and the feed gate is raised to an appropriate height to allow only the bottom carton blank of the stack to be conveyed by the conveyor belt 18 under the feed gate and onto the cutting strip application station 16. The conveyor belt 18 feeds the carton blank onto a main conveyor belt 24. The main conveyor belt 24 is run at a higher speed than the conveyor belt 18 so that a gap is provided between successive carton blanks. The conveyors are controlled such that the speeds of the two conveyor belts 18, 24 are kept in proportion to preserve the spacing of the carton blanks when the speed of the conveyor belts is increased. The cutting strip application station 16 further includes an abutment wall 26 opposite a cutting and applicator mechanism 28. A spindle 30 is rotatably mounted in supports 32 over the main conveyor belt 24. The spindle 30 mounts a wheel 34 such that a line perpendicular to the wheel is at an angle to the spindle 30. The wheel 34 contacts the carton blanks as they are carried along the main conveyor belt 24, is rotated by them and in reaction imparts an urging force towards the abutment wall 26. In this way, the carton blanks are aligned by contact with the abutment wall to be in the correct position in relation to the applicator mechanism 28. The conveyor belt 24 is perforated and runs over a perforated support surface behind which suction is applied. In this way the carton blanks are held in position on the conveyor belt 24.

The cutting strip material feed unit 14 comprises a stand 36 including a reel 38 of cutting strip material. The cutting strip material in the reel 38 is provided with adhesive on one side protected by a backing sheet. The cutting strip material itself may be a resin/paper mix. The cutting strip material is led to the applicator mechanism 28 and wound under a roller 50 and over a guide plate 52. The guide plate 52 terminates just before the cutting edge of a fixed lower die. The backing sheet is pulled around the guide plate 52 and back between a pair of rollers 54 which are arranged beneath the roller 50. The backing sheet is then lead onto a second reel 56 on the reel stand 36 below the first reel 38. The rollers 54 are driven to advance the cutting strip material from the reel 38. The relative stiffness of the cutting strip material in relation to the backing sheet means that the two are separated at the front edge of the guide plate 52 and the cutting strip material advances into the path of the upper die 58 in relation to the lower die. The upper die 58 moves down and cuts the cutting strip material to form a serrated cutting strip which is held onto the upper die 58 by suction. The upper die 58 then continues its downwards travel to bring the cut strip into contact with a carton blank. As the lower edge of the cut strip is covered with adhesive, it adheres to the carton blank which is correctly aligned by the abutment wall 26. The carton blank with the serrated cutting strip applied to it is then carried on by the main conveyor belt 24 into a hopper (not shown).

Provision may be made to deliver a lubricating agent to the surface of the cutting strip material prior to entering the applicator mechanism 28. The lubricating agent may take the form of a light oil and may be delivered to the cutting strip material by any suitable means such as, for example, a drip feed or spray means, which may be mounted behind the roller 50.

In an alternative embodiment the upper die 58 is provided with a short downwardly projecting stop at its downstream end with which to engage a carton blank when applying a cutting strip. The stop serves to arrest the motion of a carton blank upon the main conveyor 24 just prior to the cutting strip being applied and may be useful to compensate for slight changes in the gap between successive carton blanks in some cases. The stop is less likely to be needed if the main conveyor belt 24 is controlled by a servo motor as described hereinafter.

In the embodiment shown the movement of the upper die 58 is controlled by hydraulic rams supplied by a hydraulic power pack 60. The upper die 58 is hydraulically driven downwards and raised again in 0.2 seconds.

In an alternative embodiment the movement of the upper die 58 may be controlled by an electric motor driving a crankshaft (both not shown).

As the conveyor belt 24 moves continuously, cutting strips can be applied very rapidly and accurately with precise hydraulic control of the movement of the upper die 58 and accurate alignment of the carton blank. While the carton blank will be halted briefly as the cutting strip is applied to it, the contact time can be less than 1/10 of a second so that the carton blank is rapidly carried away. The carton blanks will need to be spaced as described previously to take account of this brief halting of the blank but that spacing is relatively small. While known apparatus can process carton blanks at a rate of 2000 to 5000 blanks an hour, the apparatus of the invention will process blanks at a rate of 15000 to 18000 blanks an hour, a very substantial improvement indeed.

The operation of the apparatus 10 may be controlled by an electronic processor able to both receive inputs from sensors mounted upon the apparatus 10 and send command signals to the various components of the apparatus 10. For example, the position of a carton blank upon the main conveyor belt 24 can be determined by the carton blank interrupting the light beam of a photo sensor system. The interruption of the light beam results in a signal input into the processor, which in turn issues commands to the upper die drive means and the cutting strip material feed unit 14.

The upper die drive means and the cutting strip material feed unit 14 may be controlled by servo motors to ensure that their operation is suitable for a given speed of the main conveyor belt 24. The operation main conveyor belt 24 may itself be controlled by a servo motor thereby allowing the speed of the belt 24 to be advanced or retarded to compensate for any changes in the gap between successive carton blanks fed onto the main conveyor belt 24 by the carton blank feeder unit 12.

What is claimed is:

1. An apparatus for mounting a cutting strip on a carton blank, the apparatus comprising:

(a) a system to separate a backing material from a pressure sensitive covered cutting strip material;

(b) a cutting member adapted to cut a cutting strip from the separated cutting strip material;

(c) an applying member adapted to apply the cutting strip onto a carton blank;

(d) a carrying member adapted to carry carton blanks, the carrying member adapted to move continuously in one direction in order to allow the applying member to apply the cutting strip to the carton blank without the need to reverse the direction of the carton blank; and (e) a supply member arranged to sequentially supply cut carton blanks onto the carrying member.

2. The apparatus of claim 1, wherein the carrying member comprises a conveyor belt.

3. The apparatus of claim 2, wherein the conveyor belt comprises a suction member in order to retain a carton blank.

4. The apparatus of claim 1, wherein the cutting member comprises upper and lower dies that are movable with respect to one another.

5. The apparatus of claim 4, wherein the system to separate the backing material from the cutting strip material feeds the separated cutting strip material between upper and lower dies.

6. The apparatus of claim 4, wherein a portion of the cutting strip material is cut by the movement of the dies relative to one another with the portion of the cutting strip material being retained upon one of the dies by suction.

7. The apparatus of claim 6, wherein the upper die moves relative to the lower die and the portion of the cutting strip material is retained upon the upper die.

8. The apparatus of claim 7, wherein the upper die moves the portion of the cutting strip material into contact with a carton blank on the carrying member.

9. The apparatus of claim 8, wherein at least one of upper or lower dies comprise both the cutting member and the applying member.

10. The apparatus of claim 1, further comprising an alignment system adapted to align the carton blanks carried on the carrying member with the applying member.

11. The apparatus of claim 10, wherein the alignment system comprises a channel of predetermined width.

12. The apparatus of claim 10, wherein the alignment system comprises an abutment member and a force to urge the carton blank toward the abutment member.

13. The apparatus of claim 12, wherein the carrying member is aligned to cause the carton blanks being carried to contact the abutment member.

14. The apparatus of claim 1, further comprising a mechanism adapted to deliver a lubricating agent to the cuffing strip prior to the strip being cut.

15. The apparatus of claim 1, further comprising a sensing member to sense a position of a carton blank on the carrying member and to trigger the applying member at a correct time in response to a sensed position.

16. The apparatus of claim 1, wherein the carrying member, cuffing member, and applying member are driven by electronic motors.

17. The apparatus of claim 16, wherein the electronic motors are controlled by an electronic processor.

18. The apparatus of claim 1, wherein the carrying member is adapted to only briefly halt the carton blank for less than 1/10 of a second as the cuffing strip is applied, allowing the carton blanks to be processed at an increased speed.

19. An apparatus for mounting a cutting strip on a carton blank, the apparatus comprising:

(a) a carrying member;

(b) a cuffing strip material feed unit; and (c) a cuffing strip application station;

wherein the carrying member is adapted to continuously carry carton blanks in a single direction to the cuffing strip material feed unit and the cutting strip application station; wherein the cuffing strip material feed unit is adapted to separate backing material from cuffing strip material; and wherein the cutting strip application station is adapted to cut a portion of the cuffing strip material and apply the cut portion on the carton blanks in a perpendicular direction to the motion of the carton.

20. The apparatus of claim 19, wherein the cutting strip application station moves perpendicular to the carton blank, cutting the cuffing strip material and continuing downward to bring the cut portion into contact with the carton blank.

21. An apparatus for mounting a cuffing strip on a carton blank, the apparatus comprising:

(a) a carrying member;

(b) a cuffing strip material feed unit; and (c) a cuffing strip application station;

wherein the carrying member is adapted to continuously carry carton blanks in a single direction to the cuffing strip material feed unit and the cuffing strip application station; wherein the cuffing strip material feed unit is adapted to separate backing material from cutting strip material; and wherein the cuffing strip feed unit is adapted to feed the cuffing strip material in a direction perpendicular to the motion of the carton blank.

* * * * *

UNITED STATES PATENT AND TRADEMARK OFFICE
CERTIFICATE OF CORRECTION

PATENT NO. : 6,568,449 B2
DATED : May 27, 2003
INVENTOR(S) : Edwin Wyn Owen and Ian Jamie It is certified that error appears in the above-identified patent and that said Letters Patent is hereby corrected as shown below:

Title page,
Item [57], ABSTRACT,
Lines 4 and 5, delete "cuffing" and substitute -- cutting --

Column 5,
Lines 16, 23 and 29, delete "cuffing" and substitute -- cutting --

Column 6,
Lines 2, 3, 5, 7, 8, 10, 15, 17, 20, 21, 24, 25, 26, 28 and 29, delete "cuffing" and substitute -- cutting --

Signed and Sealed this

Twenty-third Day of September, 2003

JAMES E. ROGAN
*Director of the United States Patent and Trademark Office*